US012227384B2

(12) United States Patent
Dorenbos

(10) Patent No.: US 12,227,384 B2
(45) Date of Patent: Feb. 18, 2025

(54) ROPE EDGE PROTECTOR

(71) Applicant: Dirk Otto Dorenbos, Cochrane (CA)

(72) Inventor: Dirk Otto Dorenbos, Cochrane (CA)

( * ) Notice: Subject to any disclaimer, the term of this patent is extended or adjusted under 35 U.S.C. 154(b) by 153 days.

(21) Appl. No.: 17/706,174

(22) Filed: Mar. 28, 2022

(65) Prior Publication Data

US 2022/0306421 A1 Sep. 29, 2022

Related U.S. Application Data

(60) Provisional application No. 63/167,337, filed on Mar. 29, 2021.

(51) Int. Cl.
*B65H 57/02* (2006.01)
*B66C 1/12* (2006.01)

(52) U.S. Cl.
CPC ............. *B65H 57/02* (2013.01); *B66C 1/122* (2013.01); *B65H 2701/35* (2013.01)

(58) Field of Classification Search
CPC .... B65H 57/02; B65H 2701/35; B66C 1/122; A62B 35/0075; A62B 1/18; E04G 21/3204; B65D 71/04; B60P 7/0869
See application file for complete search history.

(56) References Cited

U.S. PATENT DOCUMENTS 1,003,108 A * 9/1911 Hinrichs ............... B60P 7/0869 217/69
3,073,439 A * 1/1963 Symmonds, Jr. ..... B60P 7/0869 24/DIG. 11
3,416,652 A * 12/1968 Almasy .................. B65D 71/04 206/453
4,765,479 A * 8/1988 Roberts .................. B65D 71/04 217/69
4,938,357 A * 7/1990 Schmidt ................ B60P 7/0869 217/69
5,226,764 A * 7/1993 Meriwether .......... B60P 7/0869 410/99
5,518,348 A * 5/1996 Tucker ................. B60P 7/0869 410/99

(Continued)

OTHER PUBLICATIONS

Lyon User Instructions: Edge Guard (for one rope), Code LEG-10, Lyon Equipment Limited, 2019.

(Continued)

*Primary Examiner* — Robert Sandy
*Assistant Examiner* — Rowland Do
(74) *Attorney, Agent, or Firm* — Lewellyn Law, PLLC; Stephen Lewellyn

(57) ABSTRACT

A rope edge protector for protecting a rope as it passes over an edge during rope access and rope rescue is described. The rope edge protector has a body with a curved channel portion on an outer surface thereof that is configured to receive at least one rope along a length of the channel portion. The body has a first underside surface that is configured for placement on a first face of the edge and a second underside surface forming a dihedral angle with the first underside surface and that is configured for placement on a second face of the edge. An attachment mechanism having a strap may connect the body to a second body and may have a cam for tensioning the strap between the bodies to secure the bodies to opposing edges.

19 Claims, 8 Drawing Sheets

(56) References Cited

U.S. PATENT DOCUMENTS

| | | | | |
|---|---|---|---|---|
| 5,878,548 | A * | 3/1999 | Sauer | B65D 71/04 53/410 |
| 6,611,995 | B2 * | 9/2003 | Jackson | B60P 7/0823 24/298 |
| 7,407,353 | B1 * | 8/2008 | George | B60P 7/0869 410/99 |
| 7,677,849 | B2 * | 3/2010 | Scott | B65D 71/04 410/99 |
| 10,052,996 | B2 * | 8/2018 | Van Berlo | B60P 7/0869 |
| 2005/0260403 | A1 * | 11/2005 | Geary | B60P 3/42 206/451 |
| 2011/0272654 | A1 * | 11/2011 | Fay | B65H 57/04 254/389 |
| 2018/0283582 | A1 * | 10/2018 | Lopez | F16L 3/127 |
| 2019/0366906 | A1 * | 12/2019 | Brooks | B60P 7/12 |

OTHER PUBLICATIONS

SMC Edge Roller, retrieved from https://smcgear.com/edge-roller.html on Mar. 24, 2022.
CMC Ultra-Pro Edge Protectors, retrieved from https://smcgear.com/edge-roller.html on Mar. 24, 2022.
Cascade Edge Protector by Heightec, retrieved from https://www.heightec.com/newsledge-protector/ on March 24, 2022.

* cited by examiner

ROPE EDGE PROTECTOR

CROSS-REFERENCE TO RELATED APPLICATIONS

This application claims the benefit of U.S. Provisional Application Ser. No. 63/167,337, filed Mar. 29, 2021, the entirety of which is incorporated herein by reference.

FIELD OF THE INVENTION

The invention relates generally to protecting ropes during rope access and rope rescue, and more specifically to a system for providing a barrier on an edge for protecting a rope passing over the edge.

BACKGROUND

In the field of industrial rope access and rope rescue, ropes are used to allow workers to access difficult to reach locations without the use of scaffolding, cradles or an aerial work platform. Rope access technicians descend, ascend and traverse ropes for access and work while suspended by their harness. Maintenance and inspection of high-rise buildings, oil platforms, power plants, bridges, dams, aerials, telecommunication and electrical transmission towers, and more can be done using rope access techniques.

Standard practice is to use two ropes, a working line and a safety line, to provide a back up in the unlikely case of a failure in the first rope system. The ropes may need to be rigged to pass over the edge of a parapet, wall, plate or other structure. The surface can be rough, sharp or abrupt, reducing the ropes breaking strength and lifespan which can damage the rope and cause a safety issue. Running the rope over an edge also increases rope friction and decreases the bend radius of the rope, thereby increasing wear and tear and reducing the rope's breaking strength and lifespan. Not using a rope edge protector can also make hauling the rope up over the edge more difficult.

A number of methods have been used to protect rope as it runs over an edge. This can include placing a material over the edge on which the rope sits or positioning a cover around the rope itself. These edge management systems are often fabricated on site, using a piece of carpet, a rope bag, gloves, a fire blanket, or any other item a user has on hand. These methods and systems are often unsuitable for the task of protecting ropes.

Speciality rope edge protectors also exist, including the Lyon™ Edge Guard™ which is a stainless-steel device having "teeth" that grip the edge with a camming action. The CMC Ultra-Pro™ edge protector provides a curved device made of a slick material to cover an edge. The SMC Edge Roller™ provides a metal roller over which a rope can pass to reduce friction going over an edge. The Cascade™ Edge Protector by Heightec™ provides a stainless-steel device that sits on a 90-degree edge and includes guides to separate ropes.

SUMMARY

In accordance with the invention, there is provided an edge protector system for protecting a rope as it passes over an edge formed by a first face and a second face, the edge protector system comprising:

a body having:

a curved channel portion on an outer surface configured to receive at least one rope, wherein the channel portion is enclosed by a pair of side walls;

a first underside surface configured for placement on the first face of the edge;

a second underside surface forming a dihedral angle with the first underside surface and configured for placement on the second face of the edge; and an attachment mechanism comprising a strap for operative connection to the body and to a cam for tensioning the strap to secure the body to the edge.

The dihedral angle may be a right angle.

The cam may comprise a cam buckle. Alternatively, or in addition, the cam may be integrated into the body.

The body may include a connector for connecting to the strap. The connector may comprise a slot.

In some embodiments, there is a second body identical to the body, and the strap is for operative connection to the second body to secure the second body to a second edge opposing the first edge.

The channel portion may include one or more partitions extending out from the outer surface to divide the channel portion into a plurality of individual channels between the sidewalls. The minimum radius of curvature of the channel portion may be at least 1.5 times the width of the smallest individual channel, and preferably 3 times the width. More specifically, the minimum radius of curvature of the channel portion may be at least 22 mm.

The body may be made of plastic. The internal volume of the body may be is formed with an infill structure or it may be a solid mass.

The body may include at least one secondary connector for connecting to a secondary attachment mechanism.

There may also be a pad at least partially covering the first and second underside surfaces.

In some embodiments, the first and second underside surfaces are articulatable with respect to each other to adjust the dihedral angle.

In some embodiments, the channel portion includes a roller bearing configured to reduce friction on the rope moving through the channel portion.

In some embodiments, the body further comprises at least one magnet on the underside.

In some embodiments, there is a clevis pin for attachment across the channel portion for retaining the rope in the channel portion.

In accordance with some aspects of the invention, there is provided an edge protector system for protecting a rope as it passes over a structure having a first edge and a second opposing edge, the system comprising:

a first body and a second body, each body comprising:

a channel portion on an outer surface configured to receive at least one rope, wherein the channel portion is enclosed by a pair of side walls;

a first underside surface; and a second underside surface forming a dihedral angle with the first underside surface; and wherein the first and second underside surfaces of the first body are configured for placement adjacent the first edge, and the first and second underside surfaces of the second body are configured for placement adjacent the second opposing edge; and an attachment mechanism comprising a strap for operative connection to the first and second body and to a cam for tensioning the strap between the first and second body to secure the first body to the first edge and the second body to the second opposing edge.

BRIEF DESCRIPTION OF THE DRAWINGS

Various objects, features and advantages of the invention will be apparent from the following description of particular embodiments of the invention, as illustrated in the accompanying drawings. The drawings are not necessarily to scale, emphasis instead being placed upon illustrating the principles of various embodiments of the invention. Similar reference numerals indicate similar components.

DETAILED DESCRIPTION

Introduction

When protecting rope passing over an edge, some users wrap a canvas or "soft" rope protector around the area of rope in contact with the edge. Soft rope protectors are susceptible to abrasion over time and to physical cuts when in contact with sharp edges coupled with lateral movements of the rope access worker.

Alternatively, a user may place a "hard" rope edge protector on or over the edge where the rope sits to protect the rope from the edge. Such rope protectors may be cumbersome to transport and to install, difficult to keep in place, and may cause a rope to bend with a small bend radius which can damage the rope and reduce its breaking strength.

As described in the background, there are a number of rope edge protectors designed to protect and/or guide a rope as it passes over an edge. The inventor has realized that it is important that a rope edge protector be easily positioned and secured in place on an edge, and that when installed, it remains firmly in place and free from unintended movement.

The inventor has designed a rope edge protector for protecting a rope as it passes over an edge. Common examples of edges include a parapet, wall, plate, I-beam, piece of wood, sill, foundation, concrete or brick, pony wall, walkway, or a vessel or structure.

The present rope edge protector may provide one or more of the following advantages:

- Makes installation easier and quicker, and may allow for installation using only one hand;
- Makes installation more secure and prevents unwanted movement of the rope edge protector when in use;
- Provides a large bend radius for the rope to prevent damage and wear and tear to the rope;
- Reduces weight (which may make the unit easier to carry, and over time reduce worker physical fatigue);
- Reduces friction on the rope (which may reduce rope wear and tear and make hauling ropes back up easier with considerably less friction and damage to the edge);
- Retains the rope in the intended position during use;
- May be adapted for use on edges having various angles;
- Reduces the risk of the rope edge protector falling from the edge during installation.

Various aspects of the invention will now be described with reference to the figures. For the purposes of illustration, components depicted in the figures are not necessarily drawn to scale. Instead, emphasis is placed on highlighting the various contributions of the components to the functionality of various aspects of the invention. A number of possible alternative features are introduced during the course of this description. It is to be understood that, according to the knowledge and judgment of persons skilled in the art, such alternative features may be substituted in various combinations to arrive at different embodiments of the present invention.

Rope Edge Protector

Figure 2A:
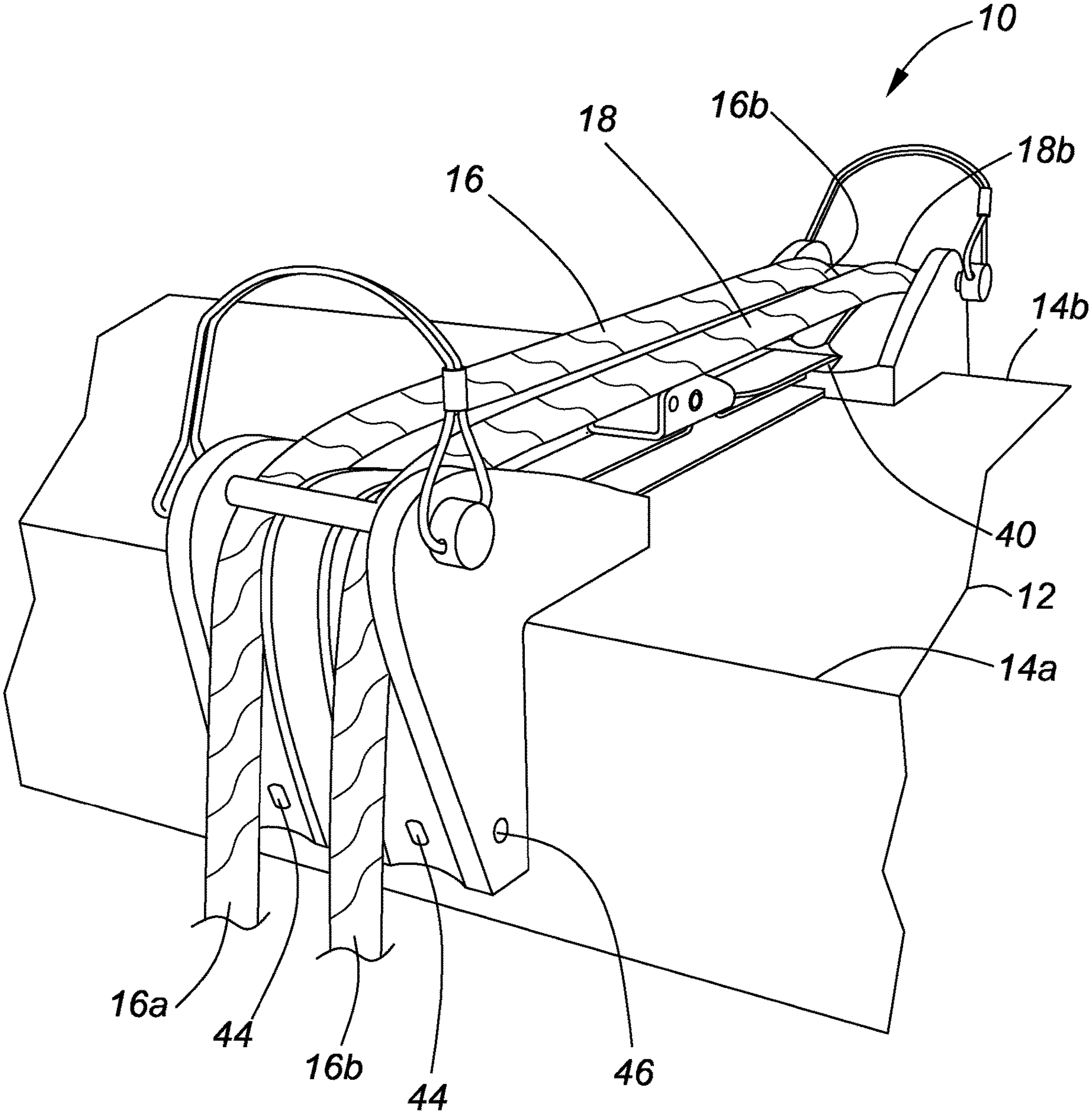
FIG. 2A is a side view of an embodiment of the rope edge protector with two bodies installed on a parapet and engaged with two ropes.
Figure 2B:
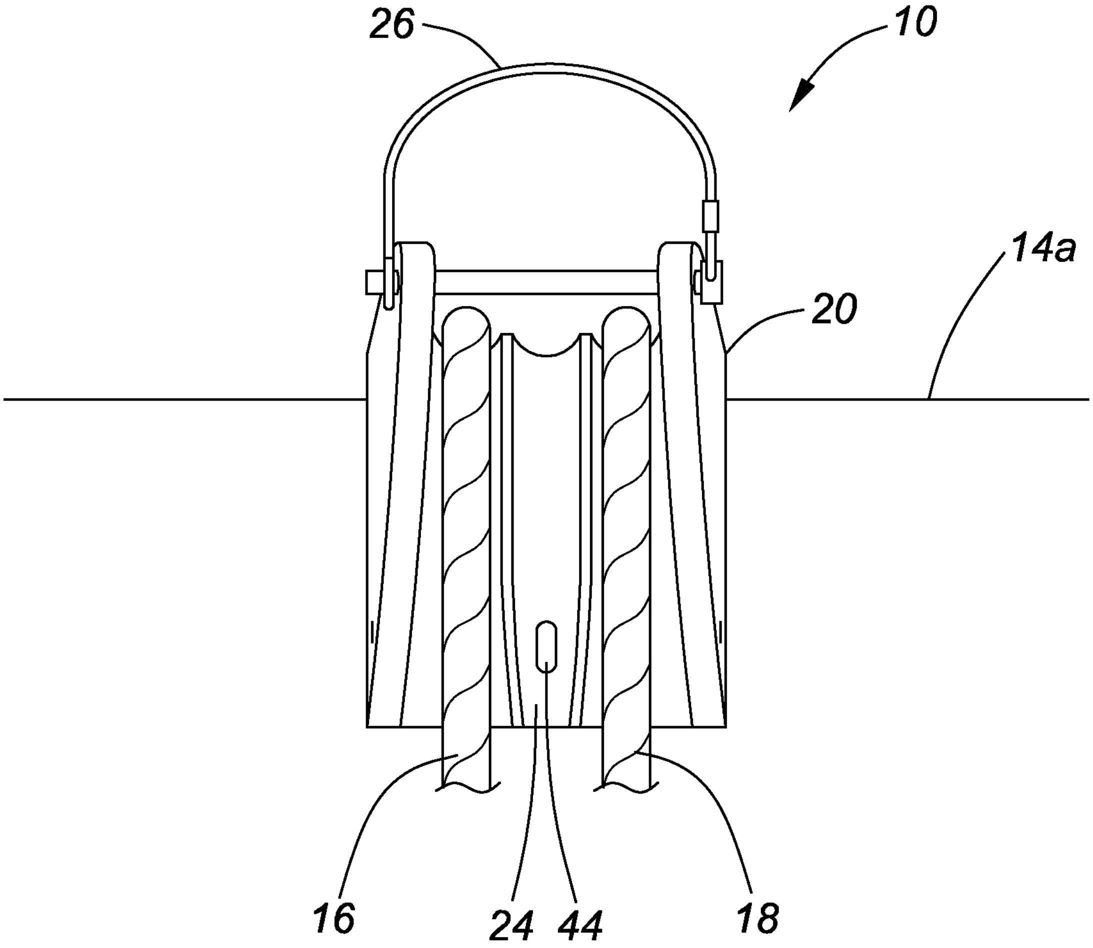
FIG. 2B is a rear view of the embodiment of FIG. 2A.

FIGS. 2A and 2B illustrate a rope edge protector 10 installed on a parapet 12 with two ropes 16, 18 retained in the rope edge protector. The ropes are protected from the edges 14*a*, 14*b* of the parapet and are retained within the rope edge protector 10 to keep the ropes in the desired position. The first end 16*a*, 18*a* of the ropes extending out of the rope edge protector support a load, such as a worker, located below the edge. The second end 16*b*, 18*b* of the ropes extending out of the rope edge protector are connected to an anchor.

Figure 3:
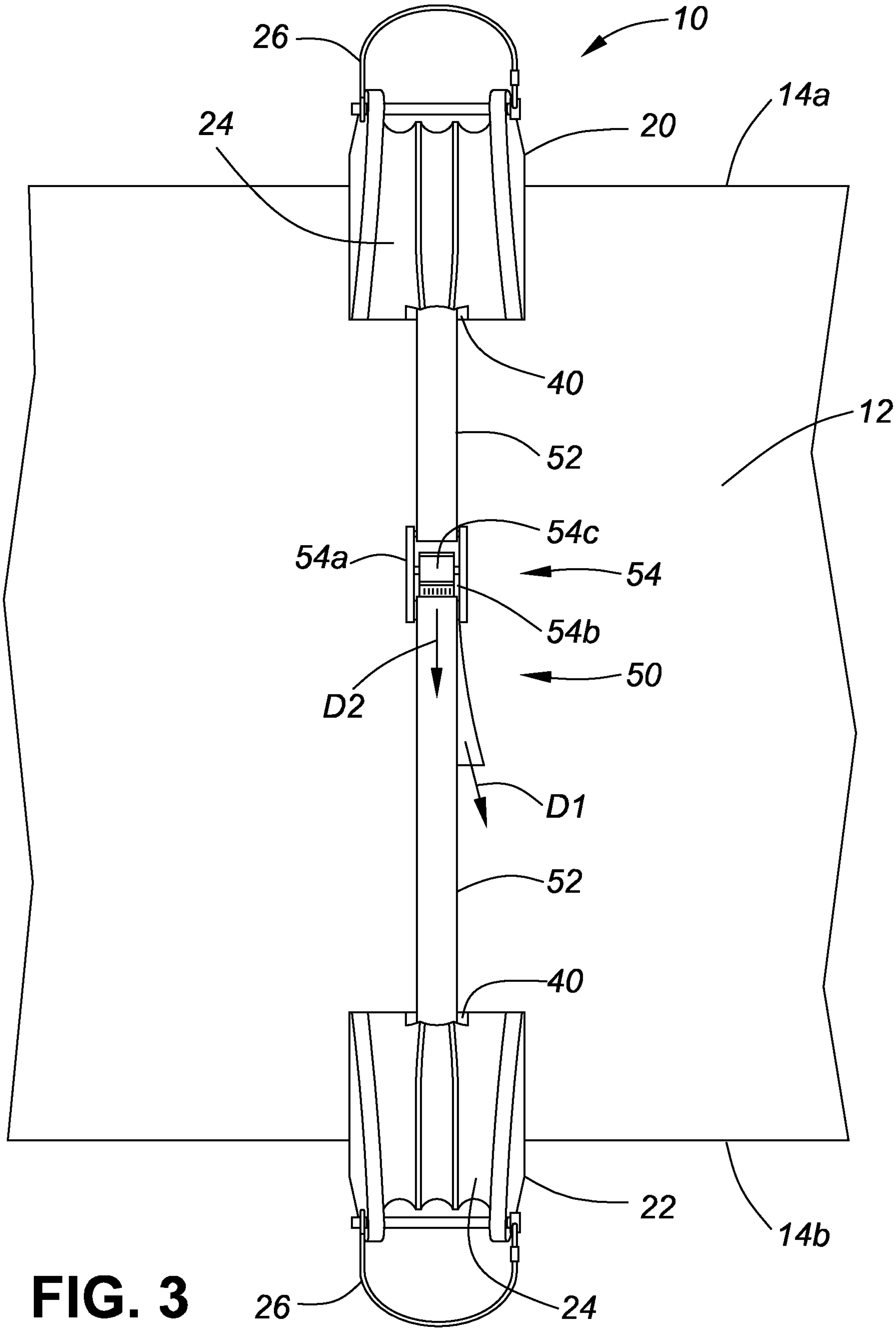
FIG. 3 is a top view of the embodiment of FIG. 2A without the ropes.

FIG. 3 illustrates a top view of the rope edge protector 10 installed on a parapet 12 with no ropes shown. In this installment, the rope edge protector 10 comprises a first body 20 and a second body 22 installed on opposing first and second edges 14*a*, 14*b* of the parapet 12. The first and second bodies 20, 22 are secured to each other using an attachment mechanism comprising a cam strap 50, which includes a piece of webbing 52 and a cam buckle 54. Tensioning the cam strap 50 by pulling the webbing 52 through the cam buckle 54 in direction D1 secures the bodies 20, 22 in place on the edges 14*a*, 14*b*. Each body 20, 22 includes a channel portion 24 for receiving one or more ropes. The ropes may be retained in the channel portion using a clevis pin 26 removably attached to the body and positioned across the width of the channel portion.

Rope Edge Protector Body

The body of the rope edge protector 10 will now be discussed in more detail with reference to FIGS. 1A-1F.

The body 20 includes a first portion 30 and a second portion 32, each having an outer surface 30*a*, 32*a* and an underside surface 30*b*, 32*b*. A curved channel portion 24 is formed along the outer surfaces and enclosed by a pair of side walls 34, 36 for receiving the one or more ropes. The first and second portions 30, 32 of the body may be shaped and sized identically to create a symmetrical body, or they may shaped and sized differently.

The channel portion 24 may include one or more partitions 24*a* to create individual rope channels 24*b* that are shaped to retain a rope and reduce friction as the rope slides through the channel portion 24. The figures illustrate three individual rope channels formed by the side walls 34, 36 and two partitions 24*a*, however any number of rope channels can be used. The side walls 34, 36 and partitions 24*a* are oriented generally parallel to the direction of rope travel T.

Figure 1A:
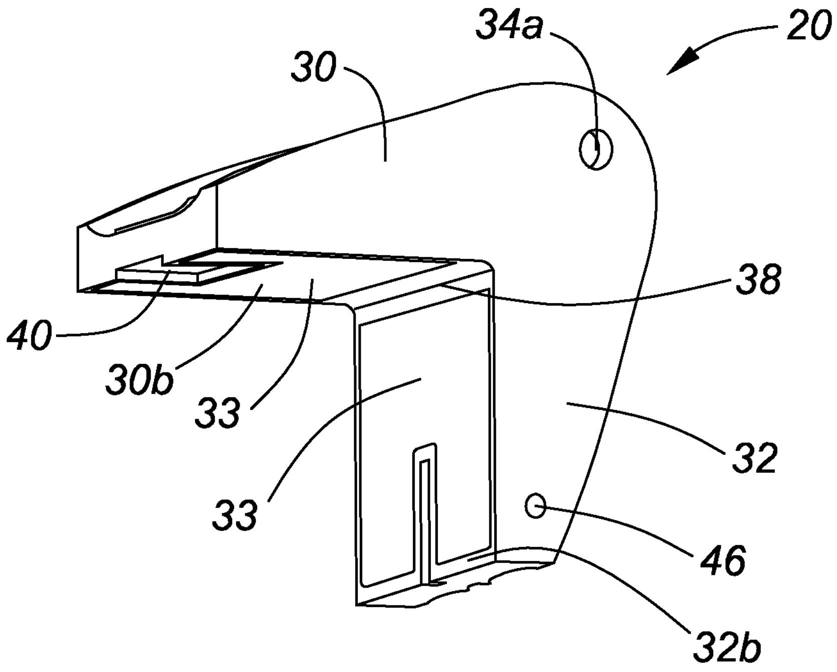
FIG. 1A is a side perspective view of an embodiment of a body of a rope edge protector.
Figure 1B:
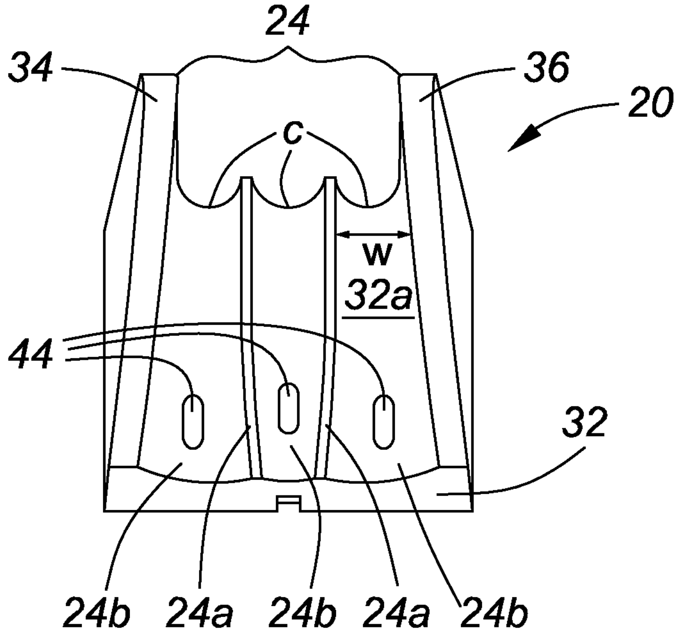
FIG. 1B is a front view of the embodiment of FIG. 1A.
Figure 1C:
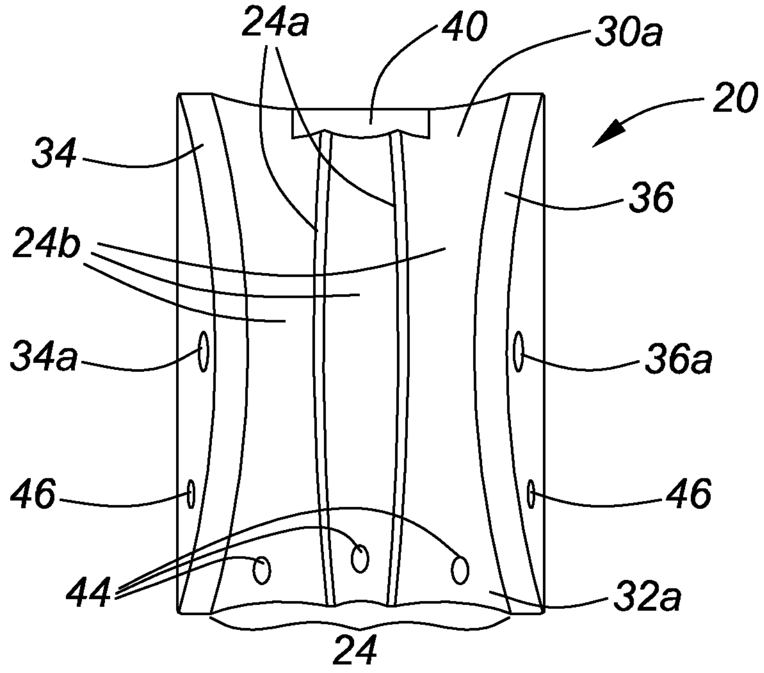
FIG. 1C is a top view of the embodiment of FIG. 1A.
Figure 1D:
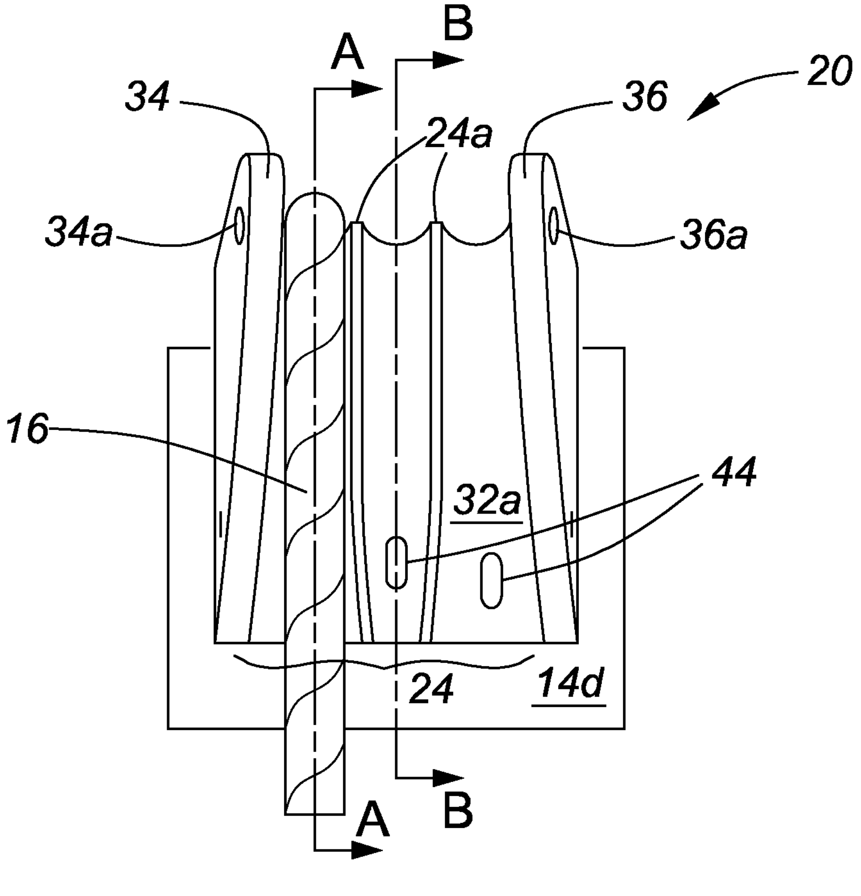
FIG. 1D is a front view of the embodiment of FIG. 1A engaged on an edge and with a rope.

As best seen in FIG. 1B, the outer surface of the individual rope channels 24*b* have a concave cross section C perpendicular to the direction of rope travel T (see FIG. 1E) through the channels. The width W of the individual channels is sized to accommodate typical rope diameters. For example, the channel diameter may be 15 mm which would accommodate a common rope diameter of 11 mm. Additional channels and diameters may be used, and typically would accommodate rope diameters used in rope access and rope rescue, which typically range from 9 to 16 mm. The individual channels may be the same or different widths.

Figure 1E:
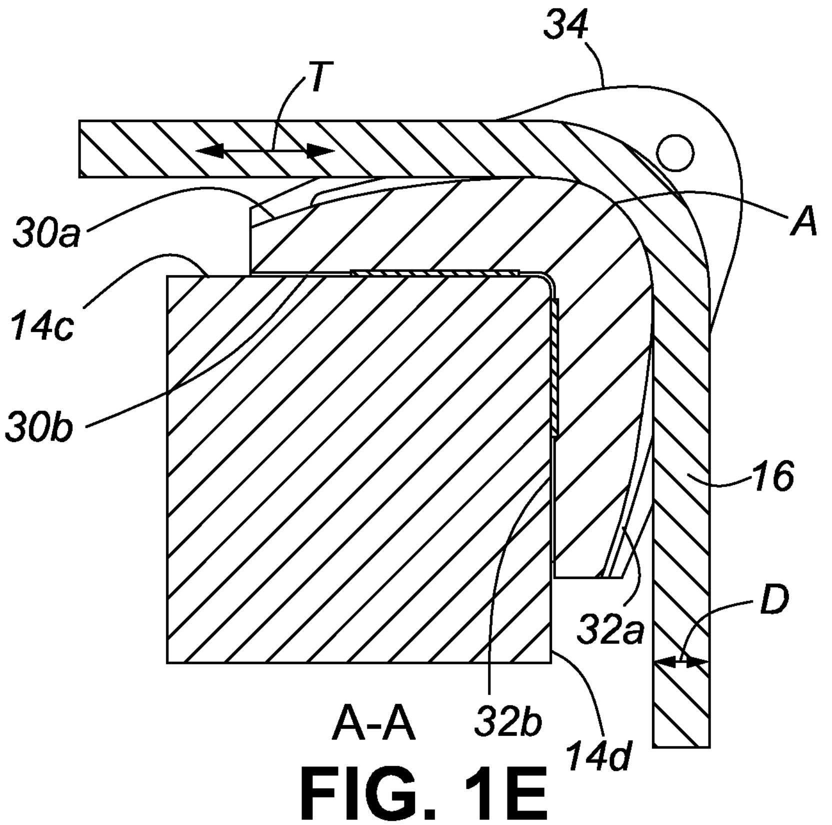
FIG. 1E is a cross-sectional view of the embodiment of FIG. 1D taken along line A-A.
Figure 1F:
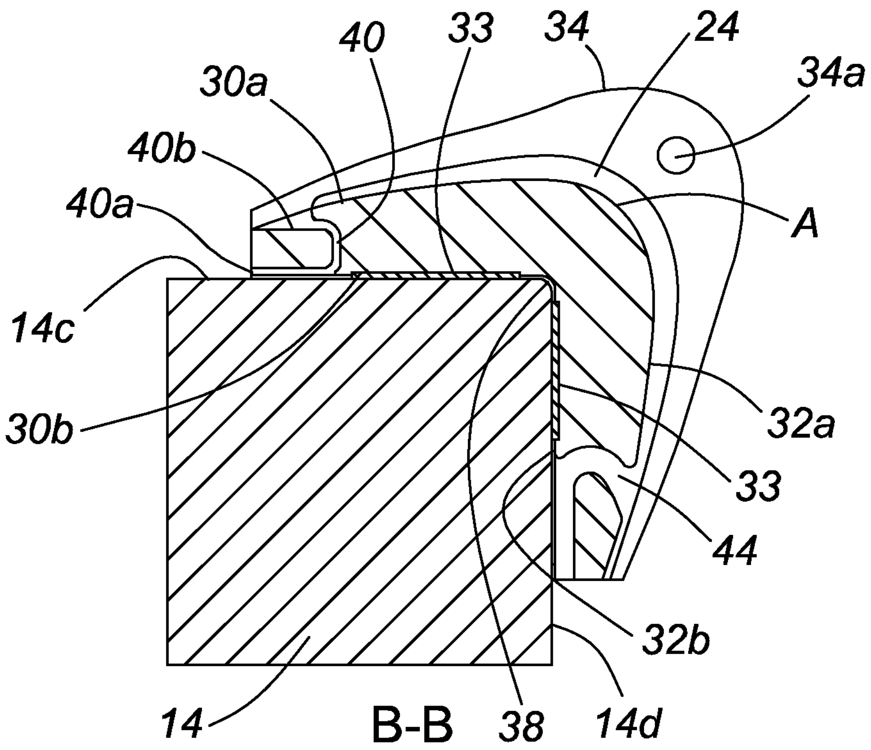
FIG. 1F is a cross-sectional view of the embodiment of FIG. 1D taken along line B-B.

The channel portion 24 is sized and shaped to create a desirable bend radius for the rope 16 as it passes through the channel. As best seen in FIGS. 1E and 1F, the radius of curvature at the apex A of the curved outer surface 30*a*, 32*a* of the channel portion 24 that is parallel with the direction of travel T of the rope creates a bend radius in the rope that is greater than the diameter D of the rope 16. Generally, the rope 16 has an outer diameter slightly less than the width W of the individual rope channel 24*b*. Therefore, configuring the minimum radius of curvature of the curved outer surface 30*a*, 32*a* of the channel portion 24 to be more than 1.5 times the width W, and preferably at least 3 times the width W, of the smallest individual rope channel 24*b* would prevent the rope from being subjected to a smaller than desired bend radius when it is used with the edge protector, i.e. a bend radius of no less than 1.5 times, and preferably 3 times, the rope diameter. Establishing a minimum rope bend radius through the use of the edge protector may allow the rope to retain more strength and/or prevent damage to the rope.

The underside surfaces 30*b*, 32*b* of the first portion 30 and second portion 32 of the body 20 are generally planar surfaces that meet at a joint 38 having an angle of approximately 90° degrees to fit against a 90° degree edge 14 with generally planar faces 14*c*, 14*d* that form the edge.

The body 20 may also include a hole 34*a*, 36*a* in each sidewall 34, 36 to receive a rope retention device comprising a clevis pin 26. When the rope retention device is in place, the rope cannot be inadvertently lifted or bumped out of the channel portion 24.

The body 20 may include one or more attachment mechanisms for securing the body on an edge, which is discussed in more detail below.

Attachment Mechanism

One option for an attachment mechanism to secure the body on an edge is shown in FIGS. 2A and 3. In this embodiment, two edge protector bodies 20, 22 are connected together using a cam strap 50. Referring to FIGS. 1A to 1F the body 20 includes an attachment slot 40 in the first portion 30 of the body for receiving the webbing 52 of the cam strap 50. The attachment slot 40 is a thru slot having openings 40*a*, 40*b* at either end of the slot such that the webbing can be looped through the attachment slot 40. This is exemplified by the U-shaped slot in FIG. 1F.

In another embodiment, the body 20 includes a built-in cam mechanism. For example, the attachment slot 40 may include a cam mechanism inside the slot for tensioning and securing a piece of webbing looped through the attachment slot.

In some embodiments, only one body 20 is used at a time and the cam strap 50 is connected to an anchor instead of to a second body 22.

In another embodiment, the body includes one or more secondary connectors for connecting cords, ropes or other attachment means to the body to tie it down. The one or more secondary connectors may be holes, as shown in FIGS. 1B, 1C, 1D and 1F, where there are three laterally spaced connector holes 44 in the second portion 32 of the body. One or more cords can be looped through one or more of these holes and tied to an anchor, such as a handrail support, walkway grating, cable tray or any other nearby support structure, to secure the body 20 in place on an edge. This is particularly useful if only one body is being used. The secondary connectors can also be used as a back-up attachment mechanism if the cam mechanism fails or is simply misplaced.

The body may also include one or more accessory connectors 46 such as holes on the sidewalls of the body for connecting an accessory cord which can act as a carrying handle.

Cam Strap Attachment Device

The cam strap 50 which is used an attachment device in some embodiments comprises a cam mechanism, which is known to those in the art. A typical example of a cam strap 50 is shown in FIG. 3, comprising a piece of webbing 52 and a cam buckle 54. A cam buckle generally includes a buckle frame 54*a* having an opening 54*b* through which webbing is threaded, and a rotatable cam 54*c* configured to be biased against the webbing 52 to prevent movement of the webbing through the opening. Rotating the cam 54*c* allows the webbing to move through the opening. The cam can generally be rotated manually or by pulling the webbing in a first direction D1 through the opening 54*b*, which exerts a force on the cam to cause it to rotate. Pulling the webbing in the opposite direction D2 through the opening 54 does not cause the cam to rotate. Thus, when the webbing extending in the direction of D2 is attached to the body 22, force on the body 22 does not cause the cam to rotate, thereby securing the body 22 in place on the edge with the webbing 52.

Other cam mechanisms as known to those skilled in the art may be used as the attachment mechanism for the body 20.

Use of the Rope Edge Protector Device

In one embodiment, to use the rope edge protector device 10, a user places the first body 20 of the device on a first edge 14*a* and the second body 22 on the second edge 14*b*. The cam strap 50 is tightened until taut by pulling on the loose end of the webbing 52. The first and second bodies 20, 22 are now held in place. One or more ropes 16, 18 are placed in the channels 24 on each body, with one end 16*b*, 18*b* of each rope being connected to an anchor. A clevis pin 24 is inserted into each body 20, 22 to prevent the rope from being lifted out of the body. The user can then use the ropes as they require, while knowing that the ropes are protected from the edges 14*a*, 14*b* with the rope edge protector 10.

Additional Options

The joint 38 as shown in FIGS. 1A and 1F between the underside surfaces 30*b*, 32*b* of the body 20 has been illustrated as having an angle of substantially 90 degrees. The joint can be at other angles, such as any angle less than 180 degrees, preferably from 30 to 150 degrees, more preferably from 60 to 120 degrees, and more preferably from 75 to 105 degrees.

Alternatively, the joint 38 can be an articulating joint with an adjustable angle. In this case, the first and second portions of the body 30, 32 are pivotably connected together.

In some embodiments, the first and/or second underside surfaces 30*b*, 32*b* are at least partially covered by a pad 33 as shown in FIGS. 1A and 1F, for example a foam or rubber pad, which provides additional friction between the underside surfaces and the planar faces 14*c*, 14*d* comprising the edge. The pad 33 also protects the planar faces from damage or wear and tear.

Figure 6:
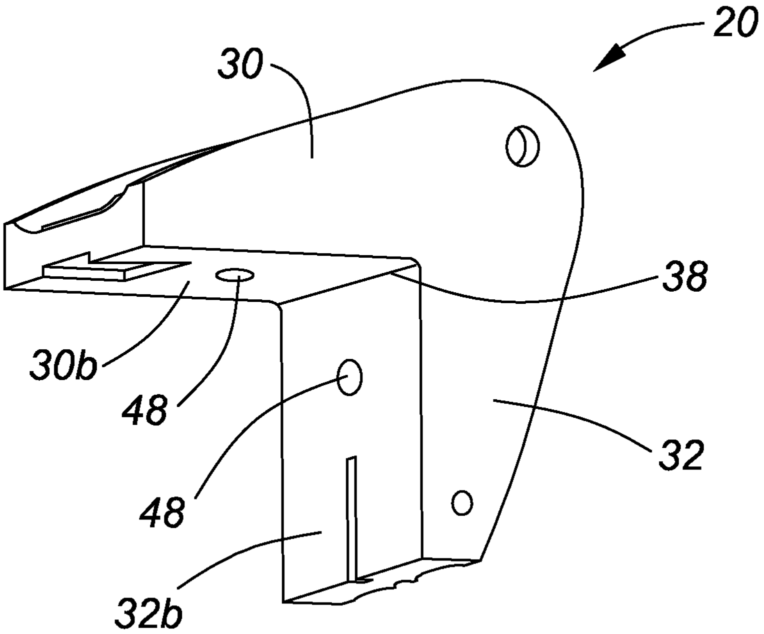
FIG. 6 is a side perspective view of an embodiment of the rope edge protector having magnets located on the underside of the body.

In some embodiments, shown in FIG. 6, the first and/or second underside surfaces 30*b*, 32*b* include one or magnets 48 to provide additional holding power when the body is placed on an edge made of a metal that attracts magnets, therefore offering an amount of additional protection against inadvertent bumps resulting in dropping the body during installation or removal.

Figure 4:
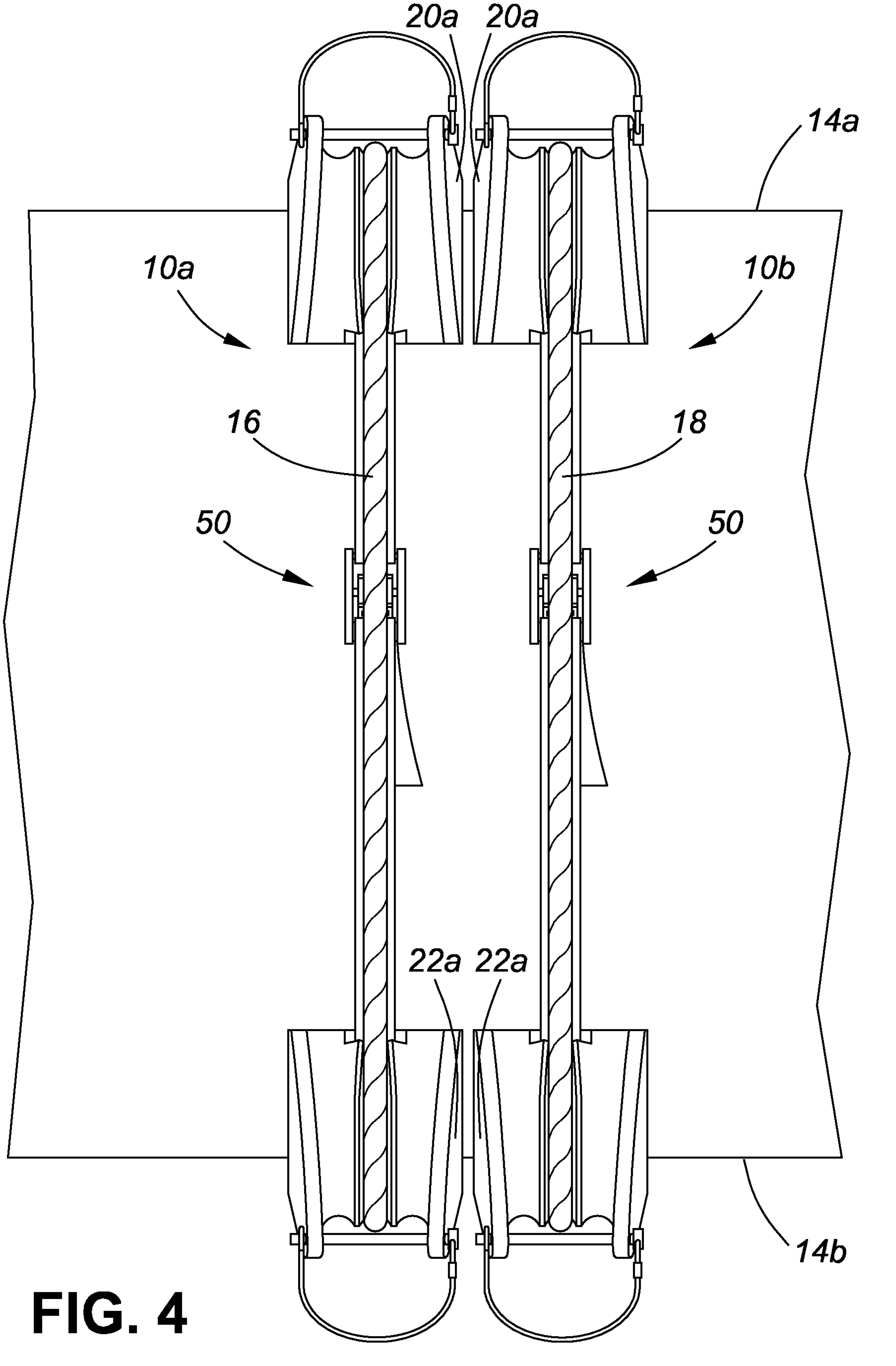
FIG. 4 is a top view of an embodiment of two rope edge protectors installed side-by-side on a parapet and each engaged with a rope.

In some embodiments, shown in FIG. 4, two rope edge protector devices 10*a*, 10*b* can be placed side by side on an edge. This may provide additional safety to allow the working rope and the backup rope to be retained in separate rope edge protector devices. In this case, the outer sides 20*a*, 22*a* of the bodies may be sized and shaped to abut laterally with each other, for example by having substantially planar lateral sides. In addition, the lateral sides may include one or more magnets (not shown) for holding the sides of adjacent bodies together.

Figure 5:
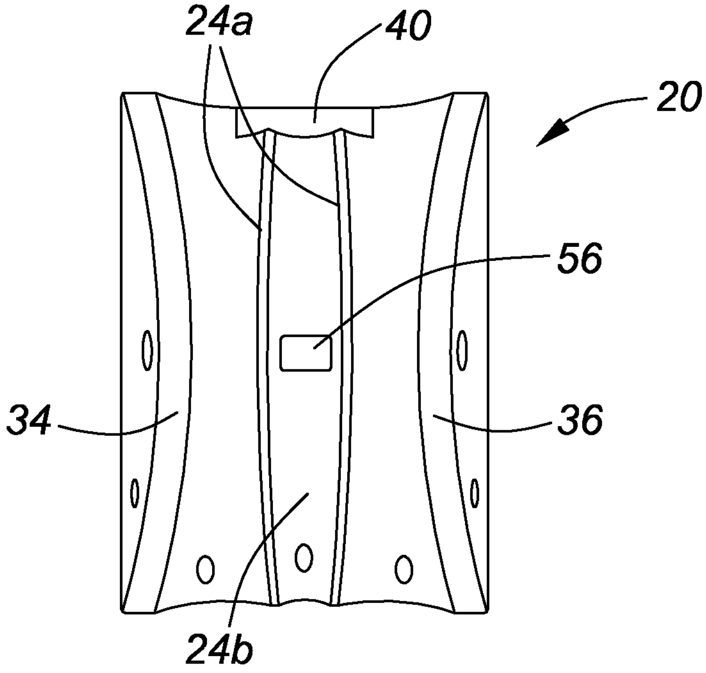
FIG. 5 is a top view of an embodiment of the body of the rope edge protector having a roller bearing in the center channel.

In some embodiments, shown in FIG. 5, the channel portion 24 includes one or more roller bearings 56 which rotate in the direction of rope travel as the rope is drawn through the channel portion over the bearing. This reduces friction on the rope and is particularly useful when hauling the rope up over the edge protector body 20.

The illustrated embodiments illustrate a removable clevis pin 26 positioned across the channel 24 for keeping the rope in the channel when in use. The rope edge protector device could be used safely without the clevis pin. Alternatively, another retention device like a cord, Velcro™, or other type of pin could be used in place of the clevis pin.

Manufacturing & Materials

The rope edge protector may be formed from plastic (e.g. nylon). For example, the rope protector may be 3D printed or injection moulded or manufactured using Computer Numerical Control (CNC).

The outer surface of the rope edge protector, and particularly the outer surface of the channel 24 may be subject to manufacturing techniques, for example vapour smoothing, to smooth the surface to reduce friction on the rope during use and to add strength to the device.

The internal volume of the rope edge protector may be formed with an infill structure or it may be a solid mass. The term "infill" refers to the structure that is printed inside an object. It may be configured in a designated percentage and pattern, which may be set in slicing software (e.g. when using a 3D printer). Infill percentage and pattern influence print weight, material usage, strength, print time and sometimes decorative properties. The infill structure may have a combination of one or more of: a honeycomb structure; a grid structure; a Hilbert structure, a rectilinear structure and a linear structure.

Although the present invention has been described and illustrated with respect to preferred embodiments and preferred uses thereof, it is not to be so limited since modifications and changes can be made therein which are within the full, intended scope of the invention as understood by those skilled in the art.

The invention claimed is:

1. An edge protector system for protecting a rope as it passes over an edge formed by a first face and a second face, the edge protector system comprising:
- a body having:
  - an outer surface comprising a curved channel portion configured to receive at least one rope, wherein the channel portion has a first end, an opposite second end and an apex disposed between the first and second ends thereof, wherein the channel portion tapers from the apex to the first end and the channel portion tapers from the apex to the second end such that when the at least one rope is disposed in the channel portion and the rope is pulled taut the rope is free from contact with the first and second ends of the channel, wherein the channel portion includes one or more partitions extending out from the outer surface to divide the channel portion into a plurality of individual channels, wherein the apex of the channel portion has a minimum radius of curvature of at least 1.5 times the width of the smallest individual channel to maintain a minimum bend radius in the at least one rope;
  - a first underside surface configured for placement on the first face of the edge; and
  - a second underside surface forming a dihedral angle with the first underside surface and configured for placement on the second face of the edge.

2. The system of claim 1, wherein the dihedral angle is a substantially 90 degree angle.

3. The system of claim 1, wherein the minimum radius of curvature of the apex of the channel portion is at least 22 mm.

4. The system of claim 1, wherein the first and second underside surfaces are articulatable with respect to each other to adjust the dihedral angle.

5. The system of claim 1, wherein the channel portion includes a roller bearing configured to reduce friction on the at least one rope moving through the channel portion.

6. The system of claim 1, wherein the body further comprises at least one magnet on the body for holding the body to the edge when the edge is made of metal that attracts magnets.

7. The system of claim 1, wherein the individual channels each have a concave cross section perpendicular to the one or more partitions.

8. The system of claim 1, wherein the body has a U-shaped channel for receiving a strap.

9. The system of claim 1, wherein the channel portion has a convex curve that extends entirely between the first and second ends.

10. An edge protector system for protecting a rope as it passes over a structure having a first edge and a second opposing edge, the system comprising:
- a first body and a second body, each body comprising:
  - an outer surface comprising a curved channel portion configured to receive at least one rope, wherein the channel portion has a first end, an opposite second end and an apex disposed between the first and second ends thereof, wherein the channel portion tapers from the apex to the first end and the channel portion tapers from the apex to the second end such that when the at least one rope is disposed in the channel portion and the rope is pulled taut the rope is free from contact with the first and second ends of the channel, wherein the channel portion includes one or more partitions extending from the outer surface to divide the channel portion into a plurality of individual channels, wherein the apex of the channel portion has a minimum radius of curvature of at least 1.5 times the width of the smallest individual channel to maintain a minimum bend radius in the at least one rope;

a first underside surface; and a second underside surface forming a dihedral angle with the first underside surface;

wherein the first and second underside surfaces of the first body are configured for placement adjacent the first edge, and the first and second underside surfaces of the second body are configured for placement adjacent the second opposing edge; and an attachment mechanism comprising:

a strap connected between the first and second bodies; and a cam for tensioning the strap to secure the first body to the first edge and the second body to the second opposing edge.

11. The device of claim 10, wherein the dihedral angle is a substantially 90 degree angle.

12. The system of claim 10, wherein the first and second bodies each have a U-shaped channel for receiving the strap.

13. The system of claim 12, wherein the strap is looped through the U-shaped channels.

14. The system of claim 10, wherein the minimum radius of curvature of the apex of the channel portion is at least 22 mm.

15. The system of claim 10, wherein the channel portion has a convex curve that extends entirely between the first and second ends.

16. The system of claim 10, wherein first and second underside surfaces are articulatable with respect to each other to adjust the dihedral angle.

17. The system of claim 10, wherein the channel portion includes a roller bearing configured to reduce friction on the at least one rope moving through the channel portion.

18. The system of claim 10, wherein the first and second bodies each comprise at least one magnet for holding the bodies to the first or second edge when the edge is made of metal that attracts magnets.

19. The system of claim 10, wherein the individual channels each have a concave cross section perpendicular to the one or more partitions.

* * * * *